US008553793B2

(12) United States Patent
Chang et al.

(10) Patent No.: US 8,553,793 B2
(45) Date of Patent: Oct. 8, 2013

(54) APPARATUS AND METHOD FOR TRANSMITTING FEEDBACK INFORMATION IN BROADBAND WIRELESS ACCESS SYSTEM

(75) Inventors: Chung-Ryul Chang, Yongin-si (KR); June Moon, Seoul (KR); Soon-Young Yoon, Seoul (KR); Keun-Chul Hwang, Yongin-si (KR); Sung-Woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 12/370,896

(22) Filed: Feb. 13, 2009

(65) Prior Publication Data

US 2009/0207887 A1 Aug. 20, 2009

(30) Foreign Application Priority Data

Feb. 14, 2008 (KR) ........................ 10-2008-0013431

(51) Int. Cl.
*H04B 7/02* (2006.01)

(52) U.S. Cl.
USPC .......................................... 375/267

(58) Field of Classification Search
USPC ...................................... 375/260, 267, 340
See application file for complete search history.

(56) References Cited

U.S. PATENT DOCUMENTS

| 7,197,084 | B2 | 3/2007 | Ketchum et al. |
| 2003/0185309 | A1 | 10/2003 | Pautler et al. |
| 2003/0185310 | A1 | 10/2003 | Ketchum et al. |
| 2005/0254556 | A1 | 11/2005 | Fujii et al. |
| 2006/0094435 | A1 | 5/2006 | Thomas et al. |
| 2007/0281624 | A1* | 12/2007 | Thomas et al. ............ 455/67.11 |
| 2008/0045153 | A1* | 2/2008 | Surineni et al. ............. 455/63.1 |
| 2009/0122884 | A1* | 5/2009 | Vook et al. .................... 375/260 |
| 2009/0196164 | A1* | 8/2009 | Vook et al. .................... 370/208 |
| 2011/0211474 | A1* | 9/2011 | Koo et al. ...................... 370/252 |
| 2012/0275416 | A1 | 11/2012 | Yokoyama |

FOREIGN PATENT DOCUMENTS

| CN | 1653768 A | 8/2005 |
| JP | 2005-509316 A | 4/2005 |
| JP | 2005-328310 A | 11/2005 |
| WO | 2007/091317 A | 8/2007 |
| WO | 2007/091317 A1 | 8/2007 |

OTHER PUBLICATIONS

Frederick W. Vook et al., Uplink Channel Sounding for TDD OFDMA, IEEE 802.16 Broadband Wireless Access Working Group, Aug. 31, 2004.

Frederick W. Vook et al., Improvements to the Uplink Channel Sounding Signaling for OFDMA, IEEE 802.16 Broadband Wireless Access Working Group, Nov. 4, 2004.

Frederick W. Vook et al., Improvements to the Uplink Channel Sounding Signaling for OFDMA, IEEE 802.16 Broadband Wireless Access Working Group, Nov. 18, 2004.

\* cited by examiner

*Primary Examiner* — Don N Vo
(74) *Attorney, Agent, or Firm* — Jefferson IP Law, LLP (57) ABSTRACT

An apparatus and method for transmitting feedback information are provided. In a method of operating a transmitter for transmitting feedback information in a broadband wireless access system, the method includes estimating a channel of a second path on the basis of information of a received downlink frame, obtaining a channel representative value corresponding to the estimated channel of the second path, modulating the channel representative value by spreading the channel representative value to a sounding symbol to be transmitted, and transmitting the modulated sounding symbol through a first path.

16 Claims, 5 Drawing Sheets

FIG.1

(CONVENTIONAL ART)

APPARATUS AND METHOD FOR TRANSMITTING FEEDBACK INFORMATION IN BROADBAND WIRELESS ACCESS SYSTEM

PRIORITY

This application claims the benefit under 35 U.S.C. §119 (a) of a Korean patent application filed in the Korean Intellectual Property Office on Feb. 14, 2008 and assigned Serial No. 10-2008-0013431 the entire disclosure of which is hereby incorporated by reference.

BACKGROUND OF THE INVENTION

1. Field of the Invention

The present invention relates to the transmitting of feedback information in a wireless communication system. More particularly, the present invention relates to an apparatus and method for effectively transmitting feedback information when a Mobile Station (MS) has two Receive (Rx) antennas and one Transmit (Tx) antenna in a broadband wireless access system.

2. Description of the Related Art

A wireless communication system uses an Adaptive Modulation and Coding (AMC) scheme to achieve data transmission optimized for a user channel condition.

In a fast fading environment, feedback information needs to be periodically transmitted to facilitate an operation of the ACM scheme. In a conventional system having one Transmit (Tx) antenna, a Mobile Station (MS) transmits a post Carrier to Interference and Noise Ratio (CINR) through a feedback channel.

Research has been conducted on a Multiple Input Multiple Output (MIMO) scheme using a plurality of Tx/Receive (Rx) antennas. Use of the MIMO scheme is being considered as one method to increase system capacity. For example, a WiMAX wave2 profile includes a 2×2 MIMO in which there are 2 Tx and 2 Rx antennas.

Similarly to a Single Input Multiple Output (SIMO) scheme, feedback information needs to be transmitted in the MIMO scheme. While the number of Rx antennas of the MS is two, the number of Tx antennas of the MS is limited to one due to implementation complexity, costs, etc.

A closed-loop type transmission scheme is based on an instantaneous value of a wireless channel between a Base Station (BS) and the MS and has a characteristic in that system capacity is great in comparison with an open-loop type transmission scheme. However, the closed-loop scheme requires a large amount of feedback information to obtain correct instantaneous information.

A feedback method includes an analog feedback method and a digital feedback method. In the analog feedback method, the MS transmits a known pilot signal such as a downlink preamble, and the BS directly estimates an instantaneous value of a wireless channel. In the digital feedback method, a downlink channel is estimated, quantized, and transmitted by the MS.

In the WiMAX standard, a sounding method is an example of an analog feedback method. A feedback method using a codebook is an example of a digital feedback method.

In case of using a digital feedback method, the aforementioned problem that the MS has one Tx antenna and two Rx antennas (i.e., 1Tx-2Rx problem) can be addressed by transmitting feedback information for each antenna. However, in this case, the feedback overhead is doubled. Also, in the case of using the analog feedback method such as the sounding method, the aforementioned problem cannot be solved if a Tx chain of the MS is fixed.

Figure 1:
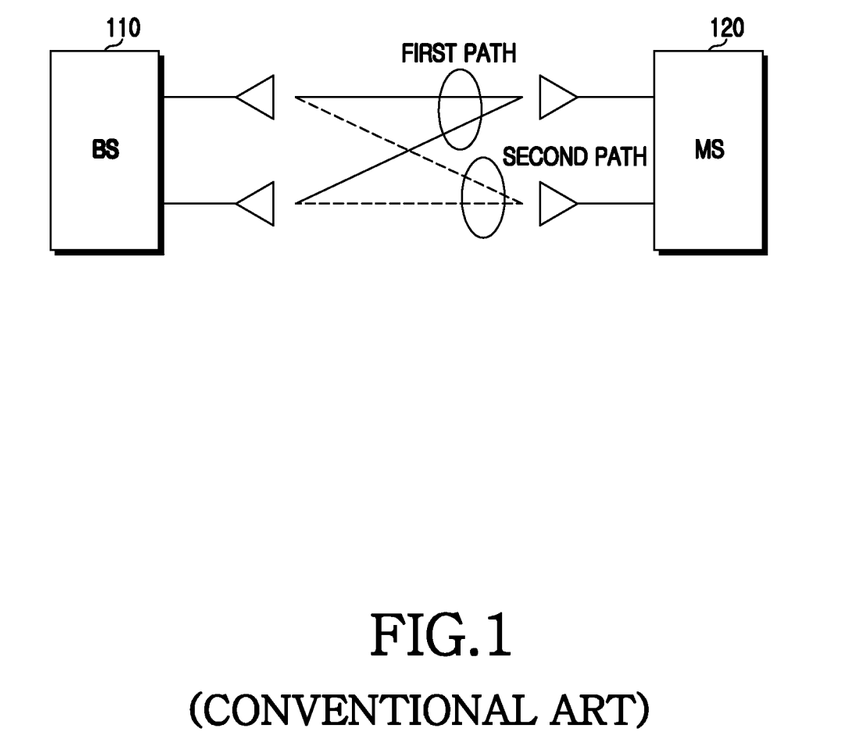
FIG. 1 illustrates a 1Tx-2Rx problem of a conventional analog feedback method such as a sounding method.

FIG. 1 illustrates a 1Tx-2Rx problem of a conventional analog feedback method such as a sounding method.

Referring to FIG. 1, in a WiMAX system using the sounding method for feedback, beamforming and closed-loop MIMO schemes are applied according to a sounding signal transmitted from a BS 110 to an MS 120. In this case, since only one Tx antenna exists, an actual channel condition is not properly estimated. As a result, interference may unexpectedly occur between antennas, which leads to a problem that a large capacity gain cannot be obtained.

Accordingly, there is a need for an apparatus and method for solving the 1Tx-2Rx problem of the analog feedback method such as the sounding method.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting feedback information in a broadband wireless access system.

Another aspect of the present invention is to provide an apparatus and method for addressing a problem of a Mobile Station (MS), having one Transmit (Tx) antenna and two Receive (Rx) antennas (i.e., 1Tx-2Rx problem), that occurs in an analog feedback method such as a sounding method in a broadband wireless access system.

Another aspect of the present invention is to provide an apparatus and method in which feedback information for two antennas can be transmitted by transmitting the feedback information only one time so as to reduce an overhead by half and to increase system capacity.

In accordance with an aspect of the present invention, a method of operating a transmitter for transmitting feedback information in a broadband wireless access system is provided. The method includes estimating a channel of a second path based on information of a received downlink frame, obtaining a channel representative value corresponding to the estimated channel of the second path, modulating the channel representative value by spreading the channel representative value to a sounding symbol to be transmitted, and transmitting the modulated sounding symbol through a first path.

In accordance with another aspect of the present invention, a method of operating a receiver for receiving feedback information in a broadband wireless access system is provided. The method includes obtaining a sounding symbol from an uplink frame received through a first path, estimating the sounding symbol, and obtaining a channel representative value for a second path while estimating the sounding symbol.

In accordance with yet another aspect of the present invention, a transmitter apparatus for transmitting feedback information in a broadband wireless access system is provided. The apparatus includes a channel estimator for estimating a channel of a second path based on information of a received downlink frame, a codebook selector for obtaining a channel representative value corresponding to the estimated channel on the second path, a sounding symbol modulator for modulating the channel representative value by spreading the channel representative value to a sounding symbol to be transmitted, and a modem for transmitting the modulated sounding symbol through a first path.

In accordance with still another aspect of the present invention, a receiver apparatus for receiving feedback information in a broadband wireless access system is provided. The apparatus includes a sounding channel separator for obtaining a sounding symbol from an uplink frame, and a sounding channel demodulator for estimating the sounding symbol and for obtaining a channel representative value for a second path while estimating the sounding symbol.

Other aspects, advantages, and salient features of the invention will become apparent to those skilled in the art from the following description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary apparatus and method for transmitting feedback information in a broadband wireless access system will be described.

In exemplary embodiments of the present invention, an analog feedback method (e.g., an uplink sounding method) of WiMAX is incorporated with a digital feedback method using a codebook. Feedback information of any one of two Receive (Rx) antennas is transmitted using the analog feedback method, and feedback information of the other Rx antenna is transmitted by spreading information corresponding to '0' or '1' to signals constituting a sounding signal.

Figure 2:
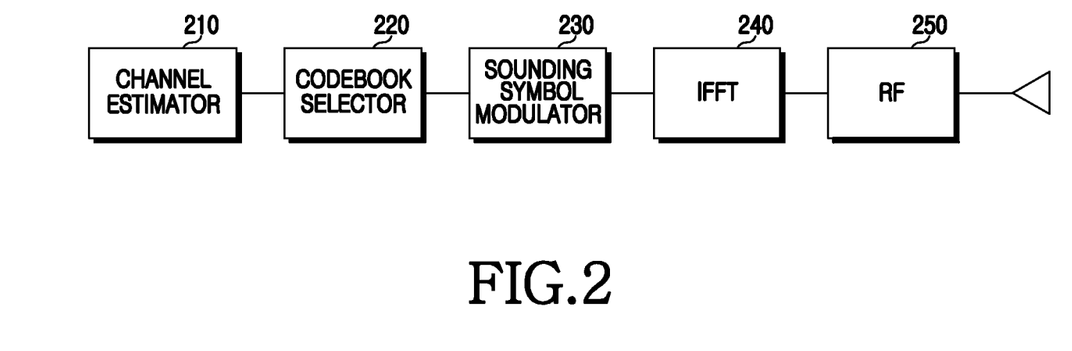
FIG. 2 is a block diagram illustrating a transmitter according to an exemplary embodiment of the present invention.

FIG. 2 is a block diagram illustrating a transmitter according to an exemplary embodiment of the present invention.

Referring to FIG. 2, the transmitter includes a channel estimator 210, a codebook selector 220, a sounding symbol modulator 230, an Inverse Fast Fourier Transform (IFFT) unit 240, and a Radio Frequency (RF) unit 250. The transmitter may be a Mobile Station (MS). The transmitter estimates a channel for a path not equipped with a Transmit (Tx) amplifier by using a preamble, a pilot, etc., of a downlink frame. Hereinafter, a path equipped with the Tx amplifier is referred to as a first path, and a path not equipped with the Tx amplifier is referred to as a second path. The codebook selector 220 selects a codebook index corresponding to the estimated channel. A sounding symbol is modulated according to the selected codebook, and thereafter the modulated sounding symbol is transmitted.

The channel estimator 210 estimates a channel for the second path by using a downlink preamble, a pilot signal, etc., which will be described below. First, a signal received by an antenna through the second path is defined by Equation (1) below.

$$Y_2 = \begin{bmatrix} h_{2,1} & h_{2,2} \end{bmatrix} \begin{bmatrix} p_1 \\ p_2 \end{bmatrix} + z_2 \quad (1)$$

In Equation (1), $Y_2$ denotes a signal received in a second antenna, $p_1$ and $p_2$ denote pilot tones received in the second antenna, and $z_2$ denotes noise received in the second antenna. In addition, $h_{2,1}$ and $h_{2,2}$ denote channel matrixes in the second antenna.

In this case, a channel can be simply estimated by dividing pilot tones $p_1$ and $p_2$ of each TX antenna by a known pilot signal or an orthogonal signal. The estimated channel is expressed by Equation (2).

$$\hat{H}_2 = \begin{bmatrix} \hat{h}_{2,1} \hat{h}_{2,2} \end{bmatrix}^T = \frac{Y_2}{inv\left( \begin{bmatrix} p_1 \\ p_2 \end{bmatrix} \right)} \quad (2)$$

In Equation (2), $Y_2$ denotes the signal received in the second antenna, and $p_1$ and $p_2$ are the pilot tones received in the second antenna. In addition, $\hat{H}_2$ and $\hat{h}_{2,1}\hat{h}_{2,2}$ are estimated channel matrixes.

The codebook selector 220 determines correlations between an estimated channel and a determined codebook. Using the correlations, the codebook selector 220 finds a codebook index corresponding to the channel estimated by the channel estimator 210 according to Equation (3) below, and selects a codebook index having a greatest value among the determined correlations.

$$I_{CB} = \underset{i}{\text{argmax}} \left( \frac{E_i^H \hat{H}_2}{|E_i^H||\hat{H}_2|} \right), i = 1, 2, \ldots, 2^{N_{CB}} \quad (3)$$

In Equation (3), E denotes a codebook matrix and $E_i$ denotes an $i^{th}$ column. When the codebook index has $N_{CB}$ bits, a total number of codebook indices is $2^{N_{CB}}$. In addition, $I_{CB}$ denotes a codebook index having a greatest value among the correlation values.

In the WiMAX wave2 standard, a sounding signal transmits a Golay code G at an allocated band in a frequency domain. In this case, a signal transmitted at a $k^{th}$ subcarrier is modulated according to Equation (4) below by using values of P and n.

$$S_k = G_k \cdot e^{j\frac{2\pi k n}{P}} \quad (4)$$

In Equation (4), P denotes a maximum delay shift and is a common factor within a cell. In addition, n denotes a shift index which is independently given to each MS that uses the same band. The value n can be assigned in the range of 0 to P−1. By using the aforementioned feature, consecutive P subcarriers can be collected and de-spread to obtain a channel value independent from each MS.

The sounding symbol modulator 230 adds an additional operation such as Equation (5) below.

$$S_{b,k} = \left( G_{b,k} \cdot e^{j\frac{2\pi k n}{P}} \right) \cdot e^{j\theta_b} \quad (5)$$

In Equation (5), $\theta_b$ denotes a phase of a $b^{th}$ band. The phase $\theta_b$ of each band is determined by a codebook index obtained according to Equation (3) above. $G_{b,k}$ denotes a Golay code for a $k^{th}$ subcarrier. $S_{b,k}$ denotes a sounding symbol for the $k^{th}$ subcarrier of the $b^{th}$ band.

When the codebook has a length of $N_{CB}$ bits, symbols of a sounding channel are assigned to $(N_{CB}+1)$ bands. In this case, a first band is used as a reference band. Since the first band has a phase $\theta_b$ of 0, it is assumed that the first band has a value of 1.

The phase $\theta_b$ of each band can be obtained as follows. If a value of an $i^{th}$ bit of the codebook index is inverted from that of an $(i-1)^{th}$ bit, the phase $\theta_b$ of the $i^{th}$ bit is 180°, and otherwise 0°.

Figure 4:
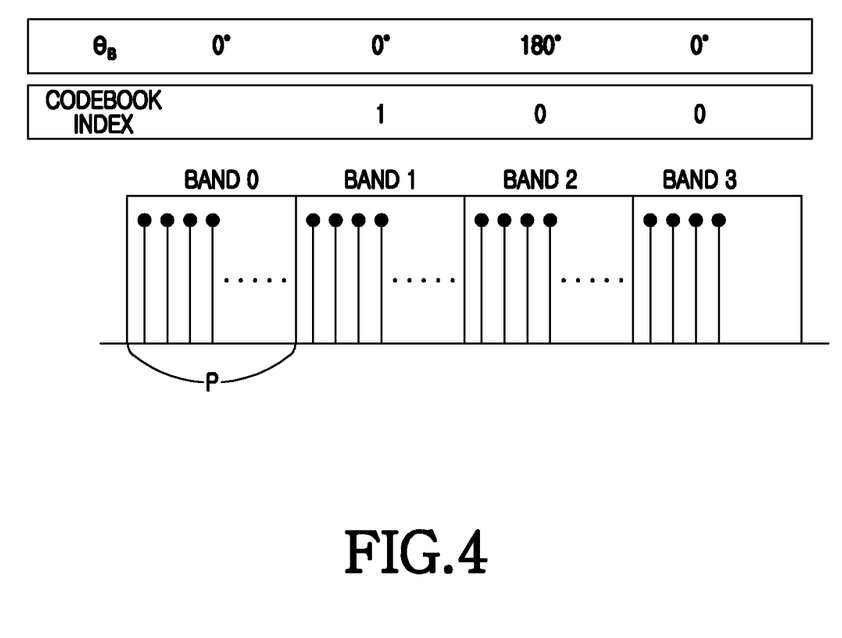
FIG. 4 illustrates a sounding signal modulation method according to an exemplary embodiment of the present invention.

FIG. 4 illustrates a sounding signal modulation method according to an exemplary embodiment of the present invention. More specifically, the aforementioned process is illustrated in FIG. 4. In this case, $N_{CB}$ is 3, and a codebook index value is 100(2). It is assumed that a subcarrier size of each band is P.

Thereafter, the modulated sounding signal is transmitted after an Orthogonal Frequency Division Multiplexing (OFDM) modulation process is performed by the IFFT unit 240 and the RF unit 250. That is, a codebook index that is a channel representative value can be transmitted according to the aforementioned method.

Figure 3:
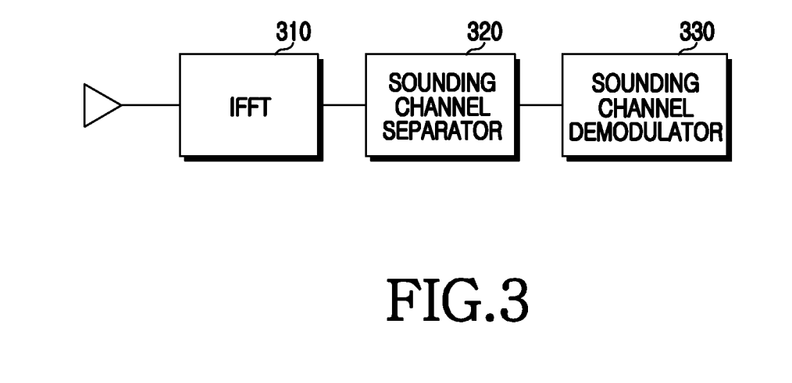
FIG. 3 is a block diagram illustrating a receiver according to an exemplary embodiment of the present invention.

FIG. 3 is a block diagram illustrating a receiver according to an exemplary embodiment of the present invention.

Referring to FIG. 3, the receiver is an apparatus for receiving a sounding signal transmitted by the transmitter of FIG. 2 and for demodulating the received sounding signal. The receiver includes a Fast Fourier Transform (FFT) unit 310, a sounding channel separator 320, and a sounding channel demodulator 330.

When the receiver receives a signal including the sounding signal, the FFT unit 310 performs an FFT operation on the received signal. Thereafter, the sounding channel separator 320 separates a symbol corresponding to a sounding channel. In this case, the separated sounding channel is used to estimate a channel of a first path and a channel of a second path which have been experienced by an MS.

The channel of the first path can be directly estimated using the sounding signal together with a pilot. In case of the channel of the second path, channel information can be obtained by demodulating a codebook index carried on the sounding signal.

The received sounding signal includes channel information for two Rx antennas of the MS. Channel information for the first path is carried on channel information for a subcarrier as shown in FIG. 4. In channel information for the second path, codebook information is included in a modulated phase of each band. The first path can be estimated by estimating the received sounding symbol.

Upon receiving the sounding signal, the sounding channel demodulator 330 can obtain channel information of the MS in the following manner. First, since it is known that a $0^{th}$ band has a phase of 0°, a channel can be obtained by Equation (6) below.

$$Y_{b,k} = H_{b,k} S_{b,k} + Z_{b,k} \quad (6)$$

$$H_0 = \frac{1}{P} \sum_{i=0}^{P-1} Y_{0,k} \cdot S_{0,k}^*$$

In Equation (6), $Y_{b,k}$ denotes a $k^{th}$ subcarrier of a $b^{th}$ band. In addition, H denotes a channel matrix, S denotes a Tx signal, and Z denotes noise.

Since channels from a $1^{st}$ band to an $N_{CB}{}^{th}$ band cannot know whether the MS transmits a phase of 0° or a phase of 180°, the following operation is performed for the two cases, as expressed by Equation (7) below.

$$H_{b,0} = \frac{1}{P} \sum_{i=0}^{P-1} Y_{0,k} \cdot \left( G_{0,k} \cdot e^{j\frac{2\pi k n}{P}} \right)^*, \quad (7)$$

$$H_{b,1} = \frac{1}{P} \sum_{i=0}^{P-1} Y_{0,k} \cdot \left( G_{0,k} \cdot e^{j\frac{2\pi k n}{P}} \cdot e^{j\pi} \right)^*$$

In Equation (7), b is in the range of 1 to $N_{CB}$, and H denotes a channel matrix. $Y_{0,k}$ denotes a $k^{th}$ subcarrier of a $0^{th}$ band. b denotes a band number. $H_{b,0}$ denotes a channel value when the phase is 0° at a $b^{th}$ band. $H_{b,1}$ denotes a channel value when the phase is 180° at the $b^{th}$ band.

Two candidate channels are generated in each band. A bit value for a channel of the $b^{th}$ band is expressed by Equation (8) below.

$$I_b = \arg \min(|H_{b-1} - H_{b,0}|, |H_{b-1} - H_{b,1}|)$$

$$H_b = H_{b,I_b} \quad (8)$$

In Equation (8), b denotes a band number. $H_b$ denotes a channel value at the $b^{th}$ band of the first path. $I_b$ denotes a determined phase value. If $I_b$ is 0, the phase is 0°, and if $I_b$ is 1, the phase is 180°. $H_{b,0}$ denotes a channel value when the phase is 0° at the $b^{th}$ band. $H_{b,1}$ denotes a channel value when the phase if 180° at the $b^{th}$ band.

That is, for a bit of a previous codebook index, if the phase is 0°, a previous bit value is maintained, and if the phase is 180°, the bit is determined by inverting the previous bit value.

In Equation (8) above, the channels of the first path and the second path can be simultaneously estimated by selecting a phase having a small difference from a $(b-1)^{th}$ estimated channel. A codebook index at the second path can be obtained according to changes of the value $I_b$.

In addition, a codebook index that is a channel representative value can be obtained according to the aforementioned method.

Figure 5:
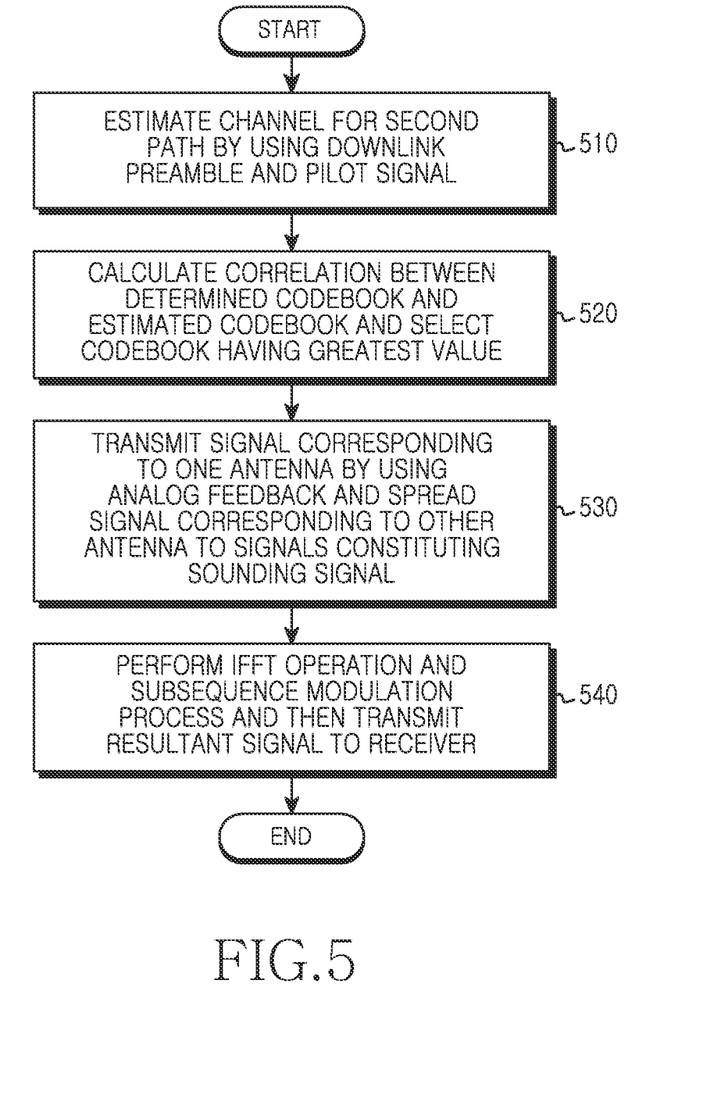
FIG. 5 is a flowchart illustrating an operation of a transmitter according to an exemplary embodiment of the present invention.

FIG. 5 is a flowchart illustrating an operation of a transmitter according to an exemplary embodiment of the present invention.

Referring to FIG. 5, the transmitter estimates a channel for a second path by using a preamble, a pilot signal, etc., included in a received downlink frame according to Equation (1) and Equation (2) above in step 510.

Next, the transmitter determines a correlation between the estimated channel and a determined codebook, and selects a codebook having a greatest value according to Equation (3) above in step 520.

Next, according to Equation (5) above, the transmitter transmits a signal corresponding to one antenna (i.e., a first path) by using analog feedback (i.e., by using a sounding channel) and spreads a signal corresponding to the other antenna (a second path) to signals constituting a sounding signal in step 530.

Next, the transmitter performs an IFFT operation and a subsequent OFDM modulation operation and then transmits the resultant signal to a receiver in step 540.

Figure 6:
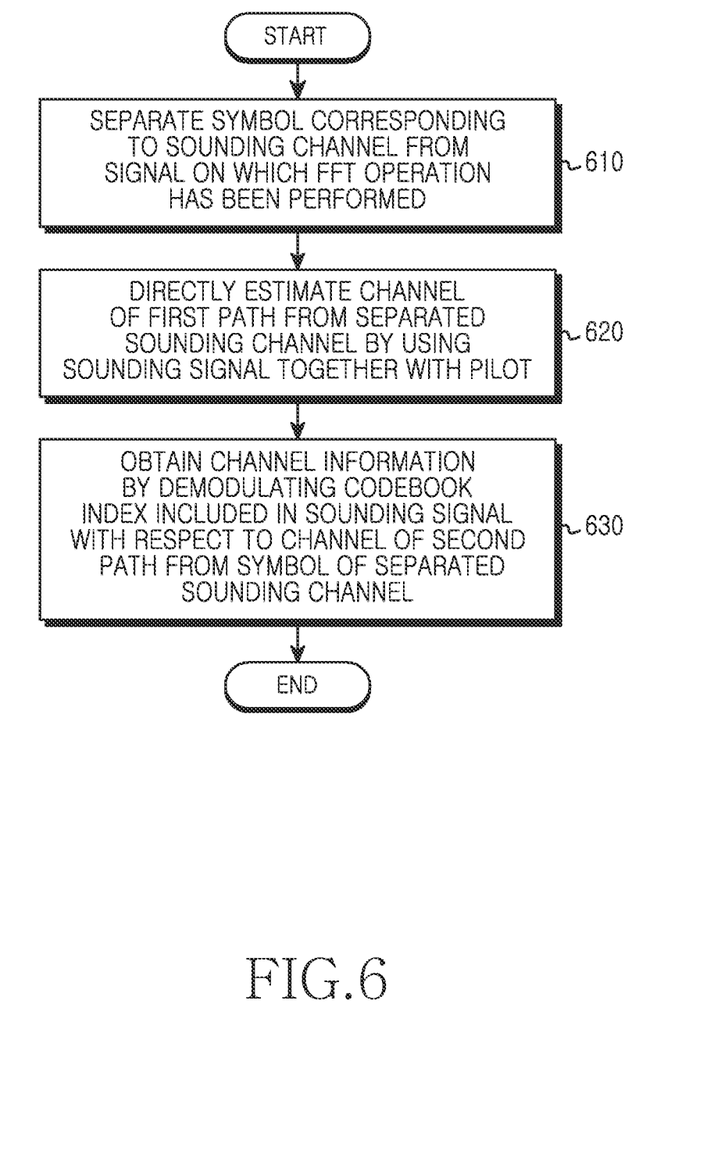
FIG. 6 is a flowchart illustrating an operation of a receiver according to an exemplary embodiment of the present invention.

FIG. 6 is a flowchart illustrating an operation of a receiver according to an exemplary embodiment of the present invention.

Referring to FIG. 6, the receiver separates a symbol corresponding to a sounding channel from a signal on which an FFT operation has been performed in step 610.

Next, by using Equation (6) above, the receiver directly estimates a channel of a first path from a symbol of the separated sounding channel by using a sounding signal together with a pilot in step 620.

Next, by using Equation (7) and Equation (8) above, the receiver obtains channel information (i.e., a codebook index) by demodulating a codebook index included in the sounding signal with respect to a channel of a second path from a symbol of the separated sounding channel in step 630.

According to exemplary embodiments of the present invention, a 1Tx-2Rx problem of an analog feedback method such as a sounding method can be effectively addressed, and an overhead can be reduced by half in comparison with a method in which a feedback operation is performed two times. In addition, there is an advantage in that cell capacity of a wireless mobile communication system increases by solving the 1Tx-2Rx problem.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of operating a transmitter for transmitting feedback information in a broadband wireless access system, the method comprising:
   estimating a channel of a second path based on information of a received downlink frame;
   obtaining a channel representative value corresponding to the estimated channel of the second path by selecting a codebook index based at least in part on a correlation between the estimated channel of the second path and a plurality of predetermined codebook indices;
   modulating the channel representative value by spreading the channel representative value to a sounding symbol to be transmitted; and
   transmitting the modulated sounding symbol through a first path.

2. The method of claim 1, wherein the information of the received downlink frame comprises at least one of a preamble and a pilot.

3. The method of claim 1, wherein the estimating of the channel of the second path based on the information of the received downlink frame comprises using the following equation:

$$\hat{H}_2 = [\hat{h}_{2,1} \hat{h}_{2,2}]^T = \frac{Y_2}{inv\left(\begin{bmatrix} p_1 \\ p_2 \end{bmatrix}\right)},$$

where $Y_2$ denotes a signal received in a second antenna, $p_1$ and $p_2$ denote pilot tones received in the second antenna, and $\hat{H}_2$ and $\hat{h}_{2,1} \hat{h}_{2,2}$ denote estimated channel matrices.

4. The method of claim 1, wherein the obtaining of the channel representative value corresponding to the estimated channel of the second path comprises using the following equation:

$$I_{CB} = \underset{i}{\operatorname{argmax}}\left(\frac{E_i^H \hat{H}_2}{|E_i^H||\hat{H}_2|}\right), i = 1, 2, \ldots, 2^{N_{CB}},$$

where E denotes a codebook matrix, $E_i$ denotes an $i^{th}$ column, $2^{N_{CB}}$ denotes a total number of codebook indices when the codebook index has $N_{CB}$ bits, and $I_{CB}$ denotes a codebook index having a greatest value among correlation values.

5. The method of claim 1, wherein the modulating of the channel representative value by spreading the channel representative value to the sounding symbol to be transmitted comprises,
   if a value of an $i^{th}$ bit of codebook index is inverted from that of an $(i-1)^{th}$ bit, setting a phase value of the $i^{th}$ bit to 180°, and if the value of the $i^{th}$ bit of the codebook index is not inverted, setting the phase value of the $i^{th}$ bit to 0°, while assigning symbols of a sounding channel to $(N_{CB}+1)$ bands when the codebook has a length of $N_{CB}$ bits in the following equation:

$$S_{b,k} = \left(G_{b,k} \cdot e^{j\frac{2\pi k n}{P}}\right) \cdot e^{j\theta_b},$$

where P denotes a max delay shift and is a common factor within a cell, n denotes a shift index which is independently given to each Mobile Station (MS) that uses the same band where the value n can be assigned in the range of 0 to P−1, $G_{b,k}$ denotes a Golay code for a $k^{th}$ subcarrier, $S_{b,k}$ denotes a sounding symbol for the $k^{th}$ subcarrier of a $b^{th}$ band, and $\theta_b$ denotes a phase of the $b^{th}$ band where the phase $\theta_b$ of each band is determined by the codebook index and $\theta_0$ is set to 0.

6. A method of operating a receiver for receiving feedback information in a broadband wireless access system, the method comprising:
- obtaining a sounding symbol from an uplink frame received through a first path;
- estimating the sounding symbol; and
- obtaining a channel representative value for a second path while estimating the sounding symbol by determining a phase value of the sounding symbol estimation result and obtaining a codebook index bit for the second path by using the determined phase value.

7. The method of claim 6, wherein the obtaining of the channel representative value for the second path while estimating the sounding symbol comprises:
- according to a phase of a sounding symbol estimation result at a $0^{th}$ band, determining the phase value of the sounding symbol estimation result at remaining bands; and
- in a process of determining the phase value of the sounding symbol estimation result at the remaining bands, obtaining the codebook index bit for the second path by using the determined phase value.

8. The method of claim 7, wherein the determining of the phase value of the sounding symbol estimation result at the remaining bands according to the phase of the sounding symbol estimation result at the $0^{th}$ band comprises:
- determining a sounding symbol estimation result for a phase of 0° and a sounding symbol estimation result for a phase of 180° with respect to the remaining bands by using the following equation;
- determining a difference value between either one of the sounding symbol estimation result for the phase of 0° and the sounding symbol estimation result for the phase of 180° and either one of those obtained at a previous band; and
- determining a result having a less value between the two difference values as a phase value of the sounding symbol estimation result at a corresponding band, wherein the equation is:

$$H_{b,0} = \frac{1}{P}\sum_{i=0}^{P-1} Y_{0,k} \cdot \left(G_{0,k} \cdot e^{j\frac{2\pi k n}{P}}\right)^*,$$

$$H_{b,1} = \frac{1}{P}\sum_{i=0}^{P-1} Y_{0,k} \cdot \left(G_{0,k} \cdot e^{j\frac{2\pi k n}{P}} \cdot e^{j\pi}\right)^*$$

where b is in the range of 1 to $N_{CB}$, H denotes a channel matrix, $Y_{0,k}$ denotes a $k^{th}$ subcarrier of a $0^{th}$ band, b denotes a band number, $H_{b,0}$ denotes a channel value when the phase is 0° at a $b^{th}$ band, and $H_{b,1}$ denotes a channel value when the phase is 180° at the $b^{th}$ band.

9. A transmitter apparatus for transmitting feedback information in a broadband wireless access system, the apparatus comprising:
- a channel estimator for estimating a channel of a second path based on information of a received downlink frame;
- a codebook selector for obtaining a channel representative value corresponding to the estimated channel of the second path by selecting a codebook index based at least in part on a correlation between the estimated channel of the second path and a plurality of predetermined codebook indices;
- a sounding symbol modulator for modulating the channel representative value by spreading the channel representative value to a sounding symbol to be transmitted; and
- a modem for transmitting the modulated sounding symbol through a first path.

10. The apparatus of claim 9, wherein the information of the received downlink frame comprises at least one of a preamble and a pilot.

11. The apparatus of claim 9, wherein the channel estimator estimates the channel of the second path based on the information of the received downlink frame by using the following equation:

$$\hat{H}_2 = [\hat{h}_{2,1}\hat{h}_{2,2}]^T = \frac{Y_2}{inv\left(\begin{bmatrix} p_1 \\ p_2 \end{bmatrix}\right)},$$

where $Y_2$ denotes a signal received in a second antenna, $p_1$ and $p_2$ denote pilot tones received in the second antenna, and $\hat{H}_2$ and $\hat{h}_{2,1},\hat{h}_{2,2}$ denote estimated channel matrices.

12. The apparatus of claim 9, wherein the codebook selector obtains the channel representative value corresponding to the estimated channel of the second path by using the following equation:

$$I_{CB} = \arg\max_i \left( \frac{E_i^H \hat{H}_2}{|E_i^H||\hat{H}_2|} \right), i = 1, 2, \ldots, 2^{N_{CB}},$$

where E denotes a codebook matrix, $E_i$ denotes an $i^{th}$ column, $2^{N_{CB}}$ denotes a total number of codebook indices when the codebook index has $N_{CB}$ bits, and $I_{CB}$ denotes a codebook index having a greatest value among correlation values.

13. The apparatus of claim 9, wherein the sounding symbol modulator modulates the channel representative value by spreading the channel representative value to the sounding symbol to be transmitted by setting a phase value of an $i^{th}$ bit to 180° if a value of the $i^{th}$ bit of the codebook index is inverted from that of an $(i-1)^{th}$ bit or by setting the phase value of the $i^{th}$ bit to 0° if the value of the $i^{th}$ bit of the codebook index is not inverted, while assigning symbols of a sounding channel to $(N_{CB}+1)$ bands when the codebook has a length of $N_{CB}$ bits in the following equation:

$$S_{b,k} = \left(G_{b,k} \cdot e^{j\frac{2\pi k n}{P}}\right) \cdot e^{j\theta_b},$$

where P denotes a max delay shift and is a common factor within a cell, n denotes a shift index which is independently given to each Mobile Station (MS) that uses the same band where the value n can be assigned in the range of 0 to P−1, $G_{b,k}$ denotes a Golay code for a $k^{th}$ subcarrier, $S_{b,k}$ denotes a sounding symbol for the $k^{th}$ subcarrier of a $b^{th}$ band, and $\theta_b$ denotes a phase of the $b^{th}$ band where the phase $\theta_b$ of each band is determined by the codebook index and $\theta_0$ is set to 0.

14. A receiver apparatus for receiving feedback information in a broadband wireless access system, the apparatus comprising:
a sounding channel separator for obtaining a sounding symbol from an uplink frame; and
a sounding channel demodulator for estimating the sounding symbol and for obtaining a channel representative value for a second path while estimating the sounding symbol by determining a phase value of the sounding symbol estimation result and obtaining a codebook index bit for the second path by using the determined phase value.

15. The apparatus of claim 14, wherein the sounding channel demodulator determines the phase value of a sounding symbol estimation result at remaining bands according to a phase of the sounding symbol estimation result at a $0^{th}$ band, and obtains the codebook index bit for the second path by using the determined phase value in a process of determining the phase value of the sounding symbol estimation result at the remaining bands, so as to obtain the channel representative value for the second path while estimating the sounding symbol.

16. The apparatus of claim 15, wherein the sounding channel demodulator determines a sounding symbol estimation result for a phase of 0° and a sounding symbol estimation result for a phase of 180° with respect to the remaining bands by using the following equation, determines a difference value between either one of the sounding symbol estimation result for the phase of 0° and the sounding symbol estimation result for the phase of 180° and either one of those obtained at a previous band, and determines a result having a less value between the two difference values as a phase value of the sounding symbol estimation result at a corresponding band, so as to determine the phase value of the sounding symbol estimation result at the remaining bands according to the phase of the sounding symbol estimation result at the $0^{th}$ band,
wherein the equation is:

$$H_{b,0} = \frac{1}{P}\sum_{i=0}^{P-1} Y_{0,k} \cdot \left(G_{0,k} \cdot e^{j\frac{2\pi kn}{P}}\right)^*,$$

$$H_{b,1} = \frac{1}{P}\sum_{i=0}^{P-1} Y_{0,k} \cdot \left(G_{0,k} \cdot e^{j\frac{2\pi kn}{P}} \cdot e^{j\pi}\right)^*$$

where b is in the range of 1 to $N_{CB}$, H denotes a channel matrix, $Y_{0,k}$ denotes a $k^{th}$ subcarrier of a $0^{th}$ band, b denotes a band number, $H_{b,0}$ denotes a channel value when the phase is 0° at a $b^{th}$ band, and $H_{b,1}$ denotes a channel value when the phase is 180° at the $b^{th}$ band.

* * * * *